Oct. 27, 1964 W. M. GILLETTE, JR., ETAL 3,154,206
PORTABLE LIFTS
Filed Dec. 28, 1961 5 Sheets-Sheet 1

INVENTORS
WILLIAM M. GILLETTE, JR.
ORLIN A. McPEEK
FRANK S. PEARNE
BY
ATTORNEYS

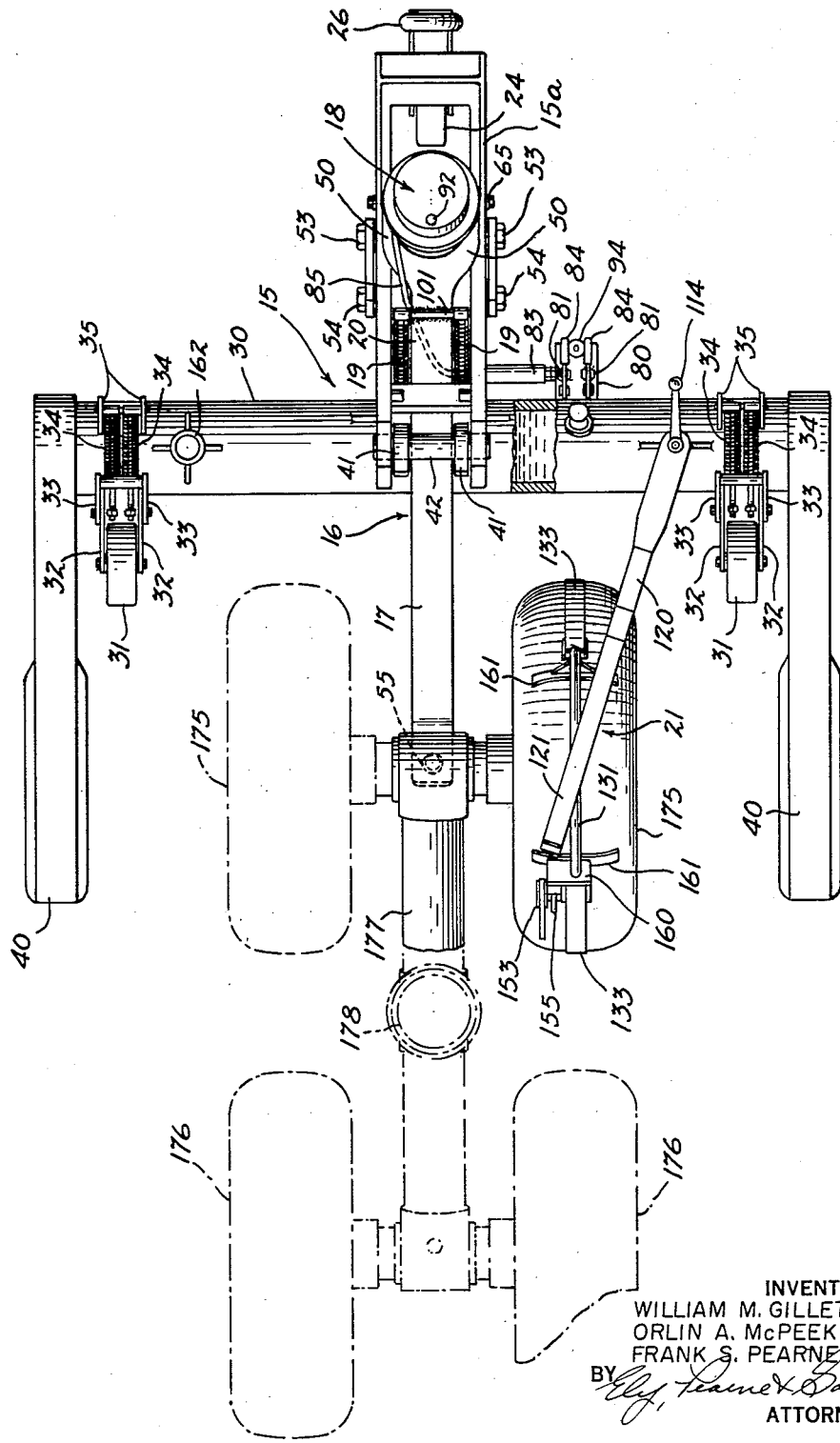

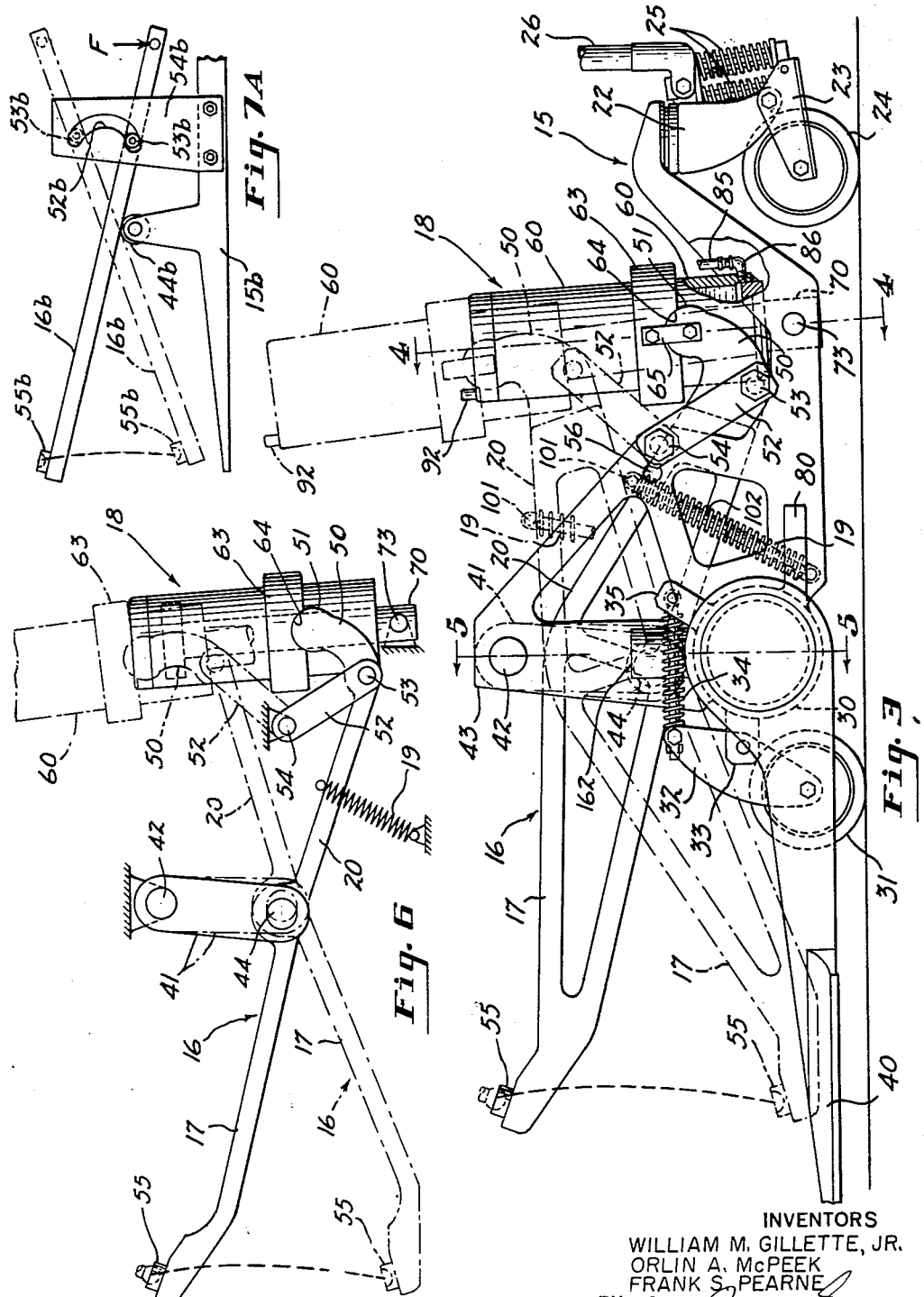

Oct. 27, 1964   W. M. GILLETTE, JR., ETAL   3,154,206
PORTABLE LIFTS
Filed Dec. 28, 1961   5 Sheets-Sheet 4
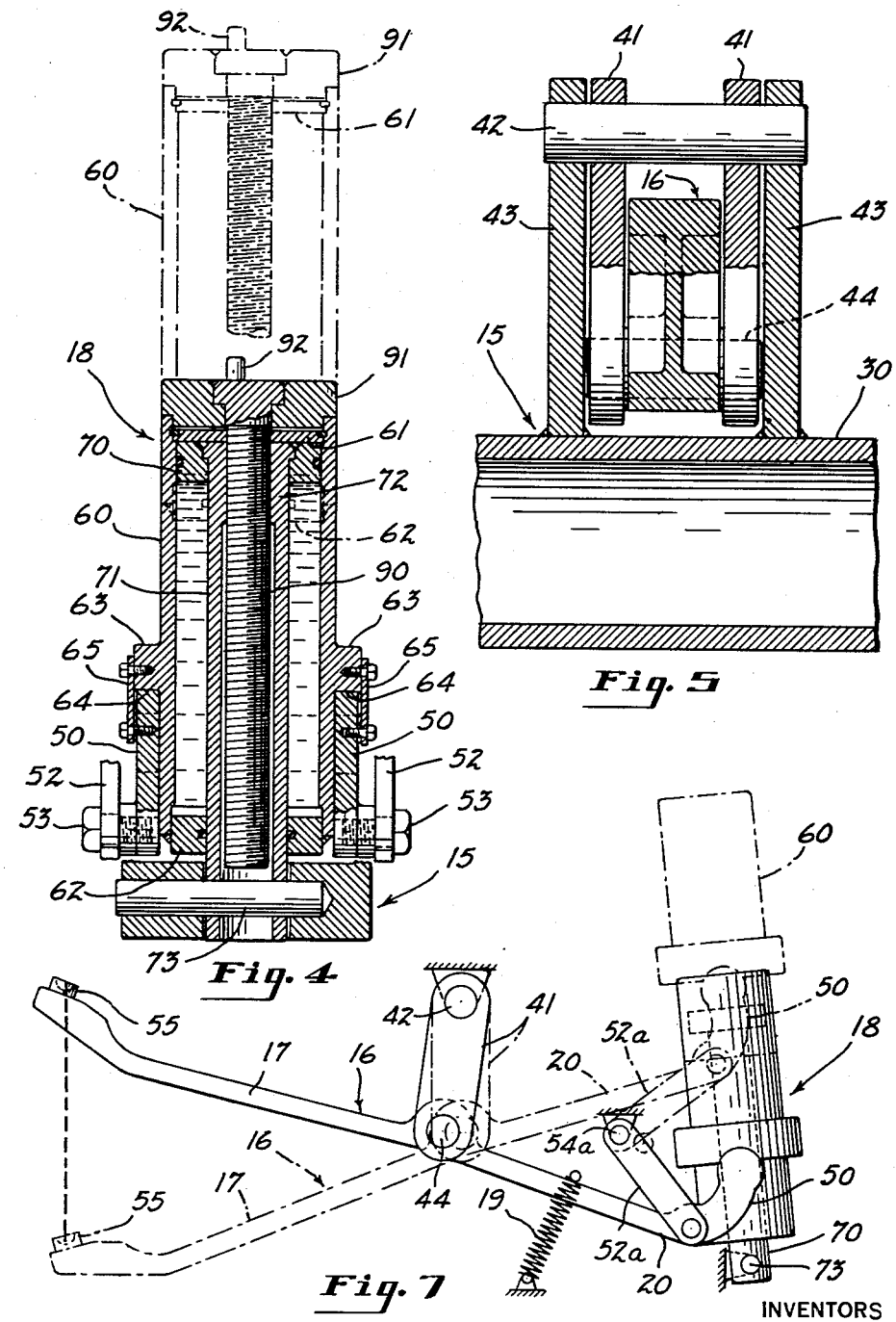
INVENTORS
WILLIAM M. GILLETTE, JR.
ORLIN A. McPEEK
FRANK S. PEARNE
BY
ATTORNEYS

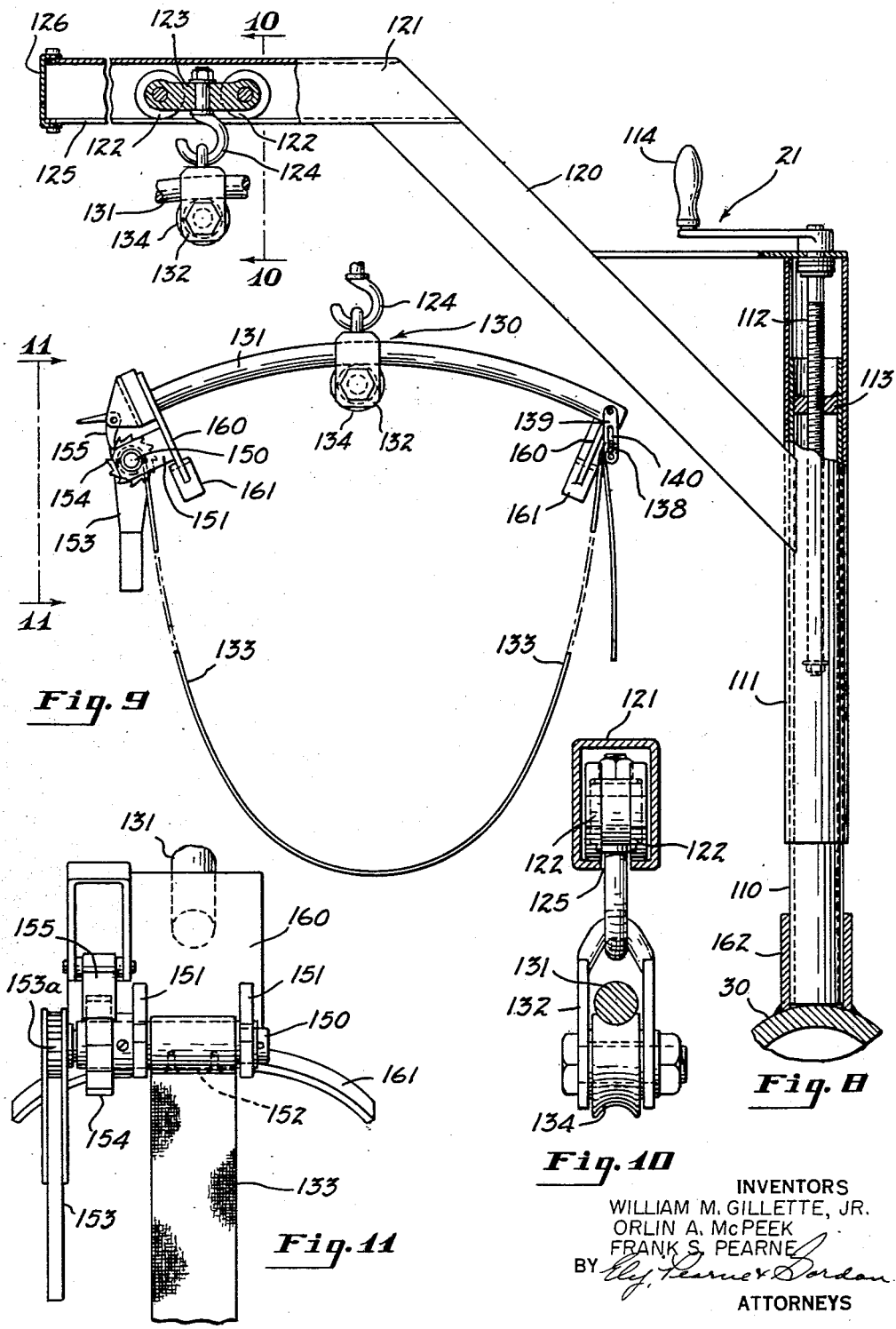

3,154,206
PORTABLE LIFTS
William M. Gillette, Jr., Huntington Park, Orlin A. McPeek, Whittier, and Frank S. Pearne, San Gabriel, Calif., assignors to Regent Jack Mfg. Co. Inc., Downey, Calif., a corporation of California
Filed Dec. 28, 1961, Ser. No. 162,813
23 Claims. (Cl. 214—330)

This invention relates generally to portable lifts, and more specifically to a mobile jack construction that is effective for raising vehicles and other loads.

Although not limited thereto, the invention is particularly concerned with the problems of elevating aircraft, especially heavy military and commercial craft, for the purposes of changing tires and/or wheels and performing other service operations on the landing gear assemblies. Many large modern aircraft of the type described employ a landing gear unit having dual sets of ground engaging wheels arranged in what is known as a "bogey wheel system." In general, the bogey type of landing gear unit is characterized by a pair of relatively closely spaced, fore and aft wheel assemblies at either end of a truck or beam that is pivoted at its center to a strut depending from the aircraft.

The bogey landing gear presents special problems when one end thereof is raised on a jack. For example, when a lifting force is applied beneath one end of the truck, the truck will pivot about the axis of the wheel assemblies on its other end. This pivotal action results in the jacking point, i.e., the point at which the lifting force is applied, rising along an arcuate path having pronounced curvature due to the relatively close spacing of the fore and aft wheel assemblies, rather than along a substantially straight vertical path. Most hydraulic ram types of jacks are capable of acting only in a straight-line vertical path and are obviously unsuitable for action along an arcuate path. Most conventional cantilever types of jacks, on the other hand, must be so positioned beyond one end of a bogey type of landing gear that the inherently arcuate path through which they act curves in the opposite direction from the path required to lift that end of the landing gear truck without requiring movement of the aircraft as the lifting action occurs. Failure to accommodate the arcuate lifting path required by the bogey type of landing gear introduces lateral forces on the landing gear structure which cannot be tolerated because they are unsafe in several respects, as is well understood in the art.

While it has been proposed to use jacks in which the entire jack mechanism remains supported on the ground on wheels, or in which the lifting mechanism is capable of rolling along the jack base, jacks of this type do not provide a safe or satisfactory solution to the problems described above. Movement of the entire jack along the ground on wheels as the lifting action occurs, in order to accommodate a horizontal component of the movement of the jack pad of the landing gear, still imposes severe horizontal stresses on the landing gear, tends to tip or tilt the jack, and is uncontrollable. Moreover, supporting the load on ground-engaging wheels of the jack causes excessive wheel loads on the ground so that the wheels, in some instances, sink into the ground and prevent horizontal movement of the jack. This also involves other obvious disadvantages.

Heretofore, insofar as we are aware, no satisfactory scheme has yet been devised for the alternative of imparting to the load lifting point on a jack a desired and controlled horizontal component of movement along a stationary jack base so as to accommodate a horizontal component of movement of the jacking pad on the landing gear, whether the scheme is applied to a conventional hydraulic ram type of jack or to a cantilever type of jack. Such control is essential if the landing gear is to be elevated with safety for the aircraft, for the jack, and for operating personnel.

The problem of elevating an aircraft employing a bogey type landing gear is further complicated by the fact that the length of the landing gear truck, and, hence, the arcuate path taken by the jacking point, will vary from one type or design of aircraft to another. Thus, it is essential to provide not only a lift that can exert a lifting force through a controlled or predetermined, arcuate path, but also one in which the arcuate path through which the lifting force is applied can be adjusted to meet the requirements of different aircraft types and designs.

In a flat tire situation requiring the changing of tires, it is not unusual for both of the relatively closely spaced tires at one end of the truck to fail simultaneously and become badly shredded, this being particularly true in the case of high speed, jet aircraft. When this situation occurs, the jacking point of the landing gear unit may be as low as 4 or 4½ inches from the ground, and the normal space between the adjacent tires at ground level may be substantially eliminated. These frequently encountered, adverse conditions have also rendered it impractical to use many conventional jacks that must be positioned on the ground immediately below the jacking point on the landing gear where the normal ground space for a jack may no longer exist.

In the case of all modern, large aircraft having large, heavy, landing gear wheels and tires, it is difficult to handle a tire and/or a wheel and tire assembly manually while removing it from or replacing it on the aircraft. The present invention provides solutions in a novel and effective manner to this and the other problems described above.

An object of the present invention is to provide a lift capable of raising vehicles and other loads under conditions that may require the lifting force to be exerted along a predetermined or controlled, arcuate path about a point or center that is not located on or in the lift structure itself.

Another object of the invention is to provide a lift as described in the preceding paragraph wherein the controlled or predetermined direction or path of force applied by the lift can be varied as desired.

A further, more specific object of the invention is to provide a portable lifting jack that is particularly constructed and adapted to elevate one end of any of the bogey type of aircraft landing gear units found on modern aircraft.

Still another object of the invention is to provide a portable lifting jack as previously described which includes a suitable tire or wheel handling mechanism for aiding in changing tires and/or wheel assemblies.

The structure of the present invention for attaining the foregoing objectives is generally characterized by a mobile, wheel-supported carriage that carries a lifting beam having an outboard, load lifting, end portion extending beyond one end of the carriage. Between its outboard and inboard extremities, the lifting beam is pivotally mounted on the carriage on a movable fulcrum for permitting oscillation of the beam about the fulcrum by a suitable actuating mechanism while imparting a predetermined movement to the fulcrum so as to raise and lower the load-lifting end of the beam along a predetermined and controlled path of travel.

The lifting beam is also connected to the carriage by a linkage that can be adjusted to impart a predetermined longitudinal movement to the beam simultaneously with its oscillation about its fulcrum. This linkage construction is such that, by adjusting the linkage, the load-lifting point can be caused to rise and fall along a straight-line vertical path or within limits, along any desired arcuate path.

When used to elevate an aircraft employing a bogey type of landing gear, the construction of the portable lift comprising the invention is such that the load-lifting point on the outboard end portion of the lifting beam can advantageously be lowered very close to the ground and positioned below a jacking pad located close to the ground between adjacent wheel assemblies at one end of the truck. The outboard end of the beam can then be raised to elevate the engaged end of the landing gear truck by rocking the beam on the carriage about its fulcrum and moving the fulcrum fore and aft as required to provide lifting movement along the desired path.

The principal advantage afforded by the invention is that the linkage connection between the carriage and the lifting beam can be arranged so that the path of travel of the lifting point on the lifting beam substantially coincides with an arcuate path of travel taken by the jacking point on the load to be lifted. This action of the lifting beam assures that the truck of a bogey type of landing gear, for example, will be firmly engaged by the lift at all times even though the jacking point will move toward and away from the carriage as the truck is elevated and lowered.

The portable lift comprising the invention also includes a crane mechanism for acting in conjunction with the lifting beam to aid in changing tires and/or wheel assemblies. According to the preferred construction, this crane mechanism comprises a vertically extensible post mounted on the jack carriage and a cantilever arm extending from the post, the arm being at least coextensive with the outboard end portion of the lifting beam. The free end portion of the cantilever arm defines a trackway for rollingly supporting a depending sling assembly with which a tire or a tire and wheel assembly may be suspended and manipulated to handle the same in a convenient manner with little manual effort.

As will hereinafter be more fully described, the crane is mounted on the lift carriage for swinging movement so that the sling can be used to support a tire or wheel assembly above the ground while it is either removed from or mounted on the elevated end of a landing gear truck. The crane also may be used to advantage for transporting wheel assemblies to and from the aircraft.

Other objects and advantages of the invention will become apparent from the following detailed description and the accompanying drawings in which:

FIGURE 2 is a top plan view of the apparatus illustrated in FIG. 1;

FIGURE 3 is an enlarged, side elevational view of the jack of FIG. 1;

FIGURE 4 is a further enlarged, cross-sectional view taken on the line 4—4 of FIG. 3;

FIGURE 5 is a similarly enlarged, cross-sectional view taken on the line 5—5 of FIG. 3;

FIGURE 6 is a partly diagrammatic view illustrating an arrangement for moving the load engaging end of the lifting beam along an arcuate path of travel;

FIGURE 7 is another partly diagrammatic view illustrating a modified arrangement for moving the load engaging end of the lifting beam along substantially a straight-line vertical path of travel;

FIGURE 7A is a diagrammatic view illustrating a modified form of the invention;

FIGURE 8 is an enlarged, fragmentary, side elevational view of the crane mechanism on the jack of FIG. 1;

FIGURE 9 is a similarly enlarged, side elevational view of the sling of the crane mechanism;

FIGURE 10 is an enlarged, cross-sectional view of the crane mechanism and a portion of its sling, the view being taken as indicated by the line 10—10 of FIG. 8; and FIGURE 11 is an enlarged, fragmentary, end elevation of the sling of the crane mechanism, the view being taken as indicated by the line 11—11 of FIG. 9.

Figure 1:
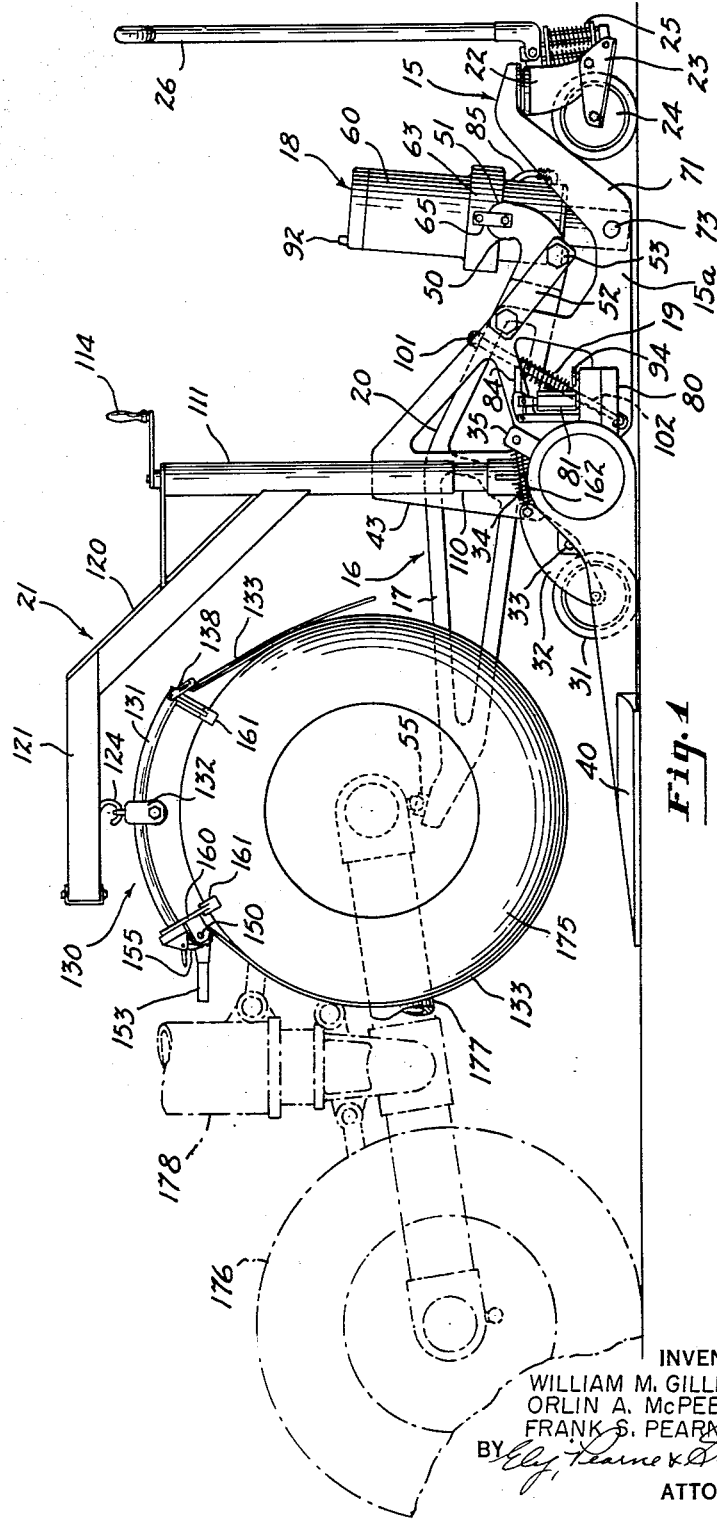
FIGURE 1 is a side elevational view of the invention showing the jack with its lifting beam in operative engagement with the truck of a landing gear unit.

Reference will first be made to FIGS. 1 and 2, which illustrate the presently preferred construction of a portable lift embodying the invention. As shown, the lift includes a wheel supported carriage 15, a lifting beam 16, that is supported on the carriage for longitudinal movement and for oscillatory movement to raise and lower the outboard lifting end 17 of the beam, and a hydraulic piston-cylinder mechanism 18 and oppositely acting springs 19 connected between the carriage and the inboard end 20 of the beam for actuating the beam. Also mounted on the carriage, near the rear end thereof, is a crane 21 for use in conjunction with the lifting beam 16.

The illustrated, wheel-supported carriage 15 comprises an elongated, skeletal frame 15a. At the front end of this frame is a swivel caster mechanism that supports the carriage for both turning and vertical shifting movement. The construction of this swivel caster may include a yoke 22 that pivotally supports a pair of spaced wheel mounts 23 (only one of which is shown) between their ends. A wheel 24 is carried between corresponding ends of the wheel mounts 23 and a pair of helical springs 25 are mounted to act, preferably in compression between the opposite ends of the wheel mounts 23 and the yoke 22 in a known manner so that the springs will be further compressed when the carriage is shifted downwardly into engagement with the ground. A tow bar 26 is connected to the caster mechanism for turning it as desired while pushing, towing, or otherwise moving the jack along the ground.

At its rear end, the carriage 15 preferably includes a transverse, rigid tube 30 (FIG. 2) that extends a substantial distance laterally to either side of the frame 15a. Wheels 31 are connected to the tube 30 near its opposite ends for the purpose of movably supporting the carriage, in cooperation with the caster wheel 24. As shown, each of these wheels 31 is carried between the corresponding ends of a pair of plates 32 which are pivotally connected intermediate their ends to fixed, cooperating arms 33 pivotally mounted on the tube. The ends of each pair of plates 32 opposite the wheel 31 are connected by a pair of helical springs 34 to another pair of arms 35 rigidly mounted on the tube. The springs 34 are disposed to act in the same manner as the springs 25 to resist downward movement of the carriage into engagement with the ground.

The foregoing construction of the carriage 15 is such that the wheels 24 and 31 cooperate to support the carriage for movement along the ground. However, when a load is applied to the lifting beam 16, as shown for example, in FIG. 1, the carriage is able to shift downwardly into engagement with the ground to stabilize itself and transmit the major portion of the applied load directly to the ground over a relatively great surface area. This downward shifting of the carriage compresses the springs 25 and 34 to create a force sufficient to return the carriage to its normal position (FIG. 3) when the applied load is removed. It will be understood that the carriage construction shown and described is merely illustrative and may be varied as desired to suit different loading conditions and different lift applications.

The above described spring-loaded wheel suspension mechanisms are desirably designed generally in accordance with U.S. Patent No. 2,891,764 of Frank S. Pearne so as to minimize the wheel pressure on the ground when the springs are further compressed by forcing the carriage downwardly into engagement with the ground.

Connected at opposite ends of the tube 30 are substantially horizontal, ground-engageable feet 40 that extend rearwardly beyond the rear end of the carriage 15. These laterally spaced feet 40 are relatively large and massive and have a large, lower, ground engaging surface to assure firm stabilizing contact with the ground over a large area when the carriage is shifted vertically downwardly, as explained above. Preferably, the feet 40 are at least coextensive with the outboard end 17 of the lifting beam 16 in order that the jack will not tilt or tip over when heavily loaded.

The lifting beam 16 is supported on the carriage 15 for longitudinal movement by a pair of supporting links 41. As shown most clearly in FIGS. 2 and 5, these links 41 are disposed at either side of the beam 16 and are pivotally suspended from a bar or shaft 42 that extends between upstanding frame members 43 of the carriage frame 15a. The lower end of the links 41 rotatably support a fulcrum bar or shaft 44 that extends through a fulcrum boss formed in the beam 16 intermediate its ends. As will hereinafter be made apparent in describing the mode of operation of the present invention, the beam 16 may be supported for longitudinal movement other than as shown and described. For example, the beam may rest on a roller mounted on a modified carriage frame, as illustrated in FIG. 7A described in more detail below.

Referring particularly to FIGS. 1–4, it will be seen that the inboard portion 20 of the lifting beam 16 terminates short of the front end of the carriage 15 and is bifurcated to form ears 50 having arcuate upper surfaces 51. A pair of control links 52 are respectively pivotally connected at one of their ends to these ears 50 by any suitable means, as by shouldered bolts 53. The opposite ends of the control links 52 are respectively pivotally connected to opposite sides of the carriage frame, as by shouldered bolts 54, which define fixed points about which the inboard end 20 of the beam 16 is swung to raise and lower the load engaging outboard end thereof through a predetermined path of travel. An adapter cup 55 or the like is mounted on the extremity of the outboard end 17 of the beam 16 for interfitting engagement with a jack pad on an aircraft landing gear, as shown in FIG. 1.

As generally pointed out above and more fully discussed hereinafter, the path of travel of the adapter cup 55 on the extremity of the outboard end 17 of the lifting beam 16 can be selectively varied by changing the lengths of the control links 52 and the location of the axis of the fixed pivot points about which these control links are rocked during raising and lowering of the lifting beam. For this purpose, it is desirable to provide one or more sets of reserve bolt holes in the carriage frame 15a, as designated by reference numeral 56 in FIG. 3, for receiving the bolts 54 and relocating the fixed pivot points for the pivot links. Additional links 52 of varying lengths may also be provided to give a greater range of adjustment. While the length of the fulcrum supporting links 41 also affects the path of travel of the adapter 55, this is so only to a relatively small degree and will not require any change in adjusting the lifting path for most purposes.

The piston-cylinder mechanism 18 for powering the lifting beam 16 is shown in FIG. 4 as including a hydraulic cylinder 60 that is closed at its upper and lower ends by plates 61 and 62, respectively. The cylinder 60 has an external collar 63 intermediate its upper and lower ends which is formed with diametrically aligned recesses 64 in its lower surface. These recesses 64 are shaped to receive the ears 50 at the inboard end of the lifting beam in bearing contact with the arcuate upper surfaces 51 of the ears. A pair of diametrically opposed straps 65 serve to hold the ears 50 in the recesses 64 while permitting the cylinder 60 to rock on the bearing surfaces 51 of the ears.

Acting within the cylinder 60 is an annular piston 70 in the form of a thick annular plate receiving and secured to a hollow piston rod 71. For purposes discussed below, the upper end 72 of the piston rod, which is engaged within the annular piston 70, is formed with screw threads in a portion of its inner surface. The lower end of the piston rod 71 extends with a sealed sliding fit through the lower cylinder plate 62 and is pivotally connected to the carriage frame 15a by a rocker pin 73. This pivotal connection of the piston rod 71 to the carriage frame permits the piston-cylinder mechanism 18 to rock fore and aft of the carriage as this mechanism is actuated to power the lifting beam 16.

Liquid for pressurizing the cylinder 60 is maintained within the rigid tube 30, which serves as a reservoir. As shown most clearly in FIGS. 1, 2 and 3, a pump block or support 80 is connected to the tube at one side of the carriage 15. This pump block 80 is of conventional construction and is formed with internal passages (not shown) and suitable check valve arrangements (also not shown) for placing the reservoir in liquid communication with a pair of pumps 81 mounted on the pump block and with a two-way conduit 83 which is connected to the side of the pump block.

In accordance with well-known practices, one of the pumps 81 may be a high volume, low pressure pump which is initially actuated, as by a lever 84, to draw liquid from the reservoir and force it through the conduit 83 and a communicating flexible conduit 85 which is connected to the lower end of the cylinder 60 by a fitting 86 (FIG. 3). Referring again to FIG. 4, it will be seen that liquid entering the cylinder 60 acts between the piston 70 and the lower end of the cylinder to force the cylinder downwardly, together with the inboard end of the lifting beam 16, until the adapter cup 55 on the outboard end portion 17 of the beam has been raised into engagement with the load.

The other of the pumps 81 may be a high pressure, low volume pump which is actuated by a similar lever 84 subsequent to the low pressure, high volume pump. This high pressure pump acts to further increase the volume and pressure of the liquid within the cylinder 60 for raising the outboard end 17 of the lifting beam to the required height, as shown, for example, by the solid line position of the beam 16 in FIG. 3. In this raised position of the lifting beam, the piston 70 will be at the top of the cylinder 60 (FIG. 4).

A tubular handle extension or the like (not shown) may be interchangeably telescoped over the pump actuating levers 84 to provide greater leverage in accordance with common practice.

In order to prevent accidental lowering of the jack under the load exerted on the outboard end 17 of the beam in the event of valve leakage, for example, the piston-cylinder mechanism 18 is provided with a lock for locking the piston and cylinder against load-lowering extension. This lock is shown in FIG. 4 as comprising a threaded shaft 90 which is fixed to a locking head 91. A turning knob or handle 92 also may be rigidly connected to the locking head 91. The shaft 90 extends freely through the upper cylinder plate 61 into threaded engagement with the upper interior portion 72 of the piston rod 71.

When the beam 16 has been raised to the desired height, the operator has merely to thread the shaft 90 downwardly through the piston rod 71 by turning the locking head 91 until it seats against the top of the cylinder as shown in FIGS. 1, 3 and 4. This cooperative engagement of the screw shaft within the piston rod is effective to lock the piston 70 in any desired position along the length of the cylinder against accidental retraction. The piston-cylinder mechanism 18 may be unlocked to permit lowering of the load supported by the lifting beam by first lifting the load slightly higher so that it is not supported by the locking head 91. Then, by means of the handle 92, the locking head 91 and threaded shaft 90 may be freely rotated by a moderate turning force to raise the locking head and screw to the dot-dash position shown in FIG. 4. This permits the cylinder 60 to operate upwardly toward the new position of the locking head 91.

When the cylinder 60 moves upwardly to effect lowering of the outboard end portion 17 of the beam, the liquid in the cylinder is expelled through the line 85, the conduit 83, and the pump block 80 to the reservoir formed by the tube 30. A valve 94 in a return passageway (not shown) in the pump block 80 (FIG. 1) may be manually actuated so that the liquid will by-pass the pumps 81 during return flow to the reservoir, as is common in the art.

For the purpose of completely expelling liquid from the cylinder 60 and overcoming the weight of the cylinder (which might prevent full lowering of the outboard end 17 of the lifting beam), the preferred embodiment of the invention includes the helical springs 19, which are mounted to exert an upward biasing force on the inboard end 20 of the lifting beam 16. As shown most clearly in FIG. 2, these springs 19 have their lower ends fastened to the carriage frame at either side of the lifting beam and have their upper ends bearing against a bar 101, which is welded across the top of the inboard portion of the beam. The springs 19 may be supported under compression around coaxially disposed, extensible sleeves 102 (FIG. 1) that are pivotally connected to the carriage frame and to the bar 101.

The coaction among the main elements of the above described apparatus for raising and lowering the adapter cup 55 on the beam 16 along a predetermined path of travel is diagrammatically illustrated in FIGS. 6 and 7. Referring first to FIG. 6, it will be seen that, when the lifting beam 16 and the cylinder 60 are in the position shown in dot-dash lines with the adapter 55 lowered close to the ground, supplying fluid under pressure to the piston-cylinder mechanism 18 will actuate it in a contracting manner to force the inboard end 20 of the beam and the cylinder downwardly against the biasing force of the springs 19 to produce corresponding upward movement of the outboard beam portion 17. This actuation of the piston-cylinder mechanism rocks the control links 52 clockwise while similarly rocking the lifting beam (through a lesser angle) about the fulcrum bar 44. The pivotal connection 73 of the piston-cylinder mechanism 18 to the carriage frame and the rocking connection between the ears 50 of the beam and the collar 63 of the cylinder permit such rocking movement by allowing the piston-cylinder mechanism to rock, first toward the right, and then to the left, as viewed in FIG. 6, as the inboard end of the lifting beam is forced downwardly, as required by the arcuate path of the pivot bolts 53. When the outboard end 17 of the lifting beam 16 is subsequently lowered with assistance from the springs 19, the control links 52 and beam 16 will pivot counter-clockwise, and the piston-cylinder mechanism will again rock, first to the right and then to the left.

The pivotal connection of the lifting beam 16 to the control links 52 also forces the lifting beam to move longitudinally as it rocks on its fulcrum bar 44. The support afforded to the beam and fulcrum bar 44 by the depending links 41 permits this longitudinal movement of the beam by swinging of the links 41 through a relatively small arc about the pivot bar 42, from the solid line position shown in FIG. 6 to the dot-dash position as the inboard end 17 of the beam is lowered.

In the particular arrangement illustrated in FIG. 6, the length of the pivot links 52 and the location of the pivotal connections 54 between the links and the carriage frame are selected so that the combined rotational and translational movement of the lifting beam causes the adapter cup 55 at the outboard extremity of the beam to move in an arcuate path, as indicated by the broken lines. Referring now to FIG. 7, however, it will be seen that the path of movement taken by the adapter cup 55 can be changed to a substantially vertical path by using longer pivot links 52a and relocating their pivot connections 54a in the reserve bolt holes 56 which are slightly above and to the left of the positions of the former pivot connections 54. It will be apparent from these two exemplary arrangements that the particular path of movement taken by the adapter cup 55 can be changed as desired by merely using different sizes of pivot links and appropriately locating the connections of these links to the carriage frame 15a.

The operating effects of the mechanisms shown in FIGS. 6 and 7, and variants thereof, may be achieved in a kinematically equivalent manner with a modified form of beam support and control mechanism as illustrated diagrammatically in FIG. 7A. As shown, a lifting beam 16b may be rockingly supported for simultaneous longitudinal movement on a fulcrum roller 44b that is, in turn, rotatably journalled in any desired manner on a suitably configured carriage frame 15b. Longitudinal movement of the beam as it is rocked by a force F (corresponding to the action of the piston-cylinder mechanism 18 previously described) may be imparted by an appropriately configured cam slot 52b of a cam 54b rigidly mounted on the carriage frame 15b for guiding a cam follower 53b mounted on the lifting beam 16b. Obviously the cam slot configuration may be selected to give (within practical limits) any desired path of travel to an adapter cup 55b on the load receiving end of the lifting beam as the load is raised and lowered. Obviously, also, by a mere reversal of parts, the cam could be built into or attached to the lifting beam and the cam follower could be mounted on the frame 16b, if desired.

By means of the type of cam control means illustrated in FIG. 7A for imparting a predetermined path of travel to the adapter cup, and by substituting differently configured cams, the path of travel of the adapter cup 55b can be made to conform as accurately as desired to any path required by the character of the device to be lifted. However, for most jack applications, such higher degree of precision in this respect is not necessary, and the somewhat simpler control link scheme of FIGS. 1 to 7 is generally preferred for that reason.

Reference is now made to FIGS. 8–11 which illustrate in detail the construction of the crane mechanism 21 for acting in conjunction with the lifting beam 16 in removing, handling, and replacing tire and wheel assemblies. In the form shown, the crane mechanism comprises a vertically extensible post that may be in the form of a rigid tube 110 telescopically engaged within a second rigid tube 111. A threaded shaft 112 is rotatably mounted at the upper end of the tube 111 to extend axially downwardly within the extensible post assembly through an annular plate 113, which is fixed within the upper end of the tube 110. This annular plate 113 is internally threaded for cooperation with the shaft 112 to raise and lower the tube 111 on the tube 110. Fixed to the top of the shaft 112 is a handle or crank 114 for rotating the shaft for that purpose.

Rigidly secured to the outside of the tube 111 is a cantilever arm 120 which is at least coextensive with the outboard portion 17 of the lifting beam 16. The cantilever arm 120 has a hollow, horizontal, free end portion 121 that defines a trackway for rollingly supporting two pairs of rollers 122. The two pair of rollers 122 are journalled on and connected by a pair of spaced links 123 for supporting a depending swivel hook 124. A slot 125 through the bottom of the arm portion 121 permits the rollers and the hook 124 to traverse the length of the trackway. The free end portion of the arm 121 may be closed by a removable plate 126.

The hook 124 supports a sling assembly, generally designated by reference numeral 130. According to the preferred construction, this assembly comprises an arcuate bar 131 to which is connected a bracket 132 for receiving the hook 124 and a fabric strap 133 which may be looped around a tire and wheel assembly in the manner illustrated in FIGS. 1 and 2. Preferably, the bar 131 is supported on a roller 134 that is journalled in the bracket 132 for permitting a tire and wheel assembly to be rotated sufficiently, while suspended by the crane, for lining up the wheel with the interfitting brake pucks or keyways when remounting a tire and wheel assembly.

In order that the strap 133 may be tightened about the tire and wheel assembly to firmly support it, one end of the strap is constrained by any suitable type of adjusting clamp 138 (not shown in detail) that is mounted between a pair of links 139 that are pivotally connected to opposite sides of one end of the bar 131. The strap 133 is adjustable in the clamp 138 for roughly adjusting the length of the loop formed by the strap as shown in FIG. 9.

At the opposite end of the bar 131 is a ratchet mechanism for taking up slack in the strap 133 to tighten it around the tire and wheel assembly. In the illustrated construction, this ratchet mechanism comprises a shaft 150 that is rotatably carried by brackets 151 mounted on this end of the bar 131. The end of the strap 133 is secured to a take-up reel 152 that is fixed to the shaft 151.

For the purpose of turning the shaft 150 and the attached reel 152, a conventional ratchet handle 153 is rotatably mounted on one end of the shaft for cooperation with a ratchet wheel 153a that is fixed on the shaft. Also mounted on the shaft 150 is a holding ratchet wheel 154 that cooperates with a holding pawl 155 for permitting one-way rotation of the shaft in a direction effective to tighten the strap.

The crane 20 is further shown as including a plate 160 at either end of the arcuate bar 131. Secured to the bottom of each plate 160 is an elongated, curved, metal strip 161 that extends transversely to the bar 131. These plates 160 and strips 161 act in conjunction with the strap 133 by forming spaced supports for supporting the tire and wheel assembly laterally as the strap is tightened. In order that the strips 161 may be disposed in firm contact with the wheel assembly, it is preferred to construct the plates 160 so that they extend downwardly and toward each other in planes that are radial with respect to the arcuate bar 131.

As shown in FIGS. 2 and 8, the above-described crane 20 is removably mounted on the carriage 15 for swinging movement toward and away from the outboard end of the lifting beam 16. This is accomplished by means of a socket 162 on the top of the carriage tube 30 which rotatably and removably receives the lower end of the tube 110. Preferably, another socket 162 is similarly located near the other end of the tube 30 so that the crane can be mounted as shown on either side of the lifting beam.

The operation of the lift provided by the invention is very simple and will be evident from the foregoing description and from FIGS. 1 and 2 which illustrate the use of the lift in a typical situation involving the handling of aircraft. As generally discussed above, the landing gear of the aircraft may comprise two sets of dual wheels 175 and 176, respectively mounted at opposite ends of a beam 177 which is pivotally connected intermediate its ends to a strut 178. When changing wheel assemblies, as for example, because of flat tires on one or both of the wheel assemblies 175, the lift can be readily and conveniently positioned at one end of the beam 177 with the outboard extremity of the lifting beam 16 extending between wheels 175 so that the adapter cup 55 is close to the ground and is below the jacking point of the landing gear unit. Actuation of the piston-cylinder mechanism 18 is then effective to raise the adapter cup into engagement with and then to lift the tire and wheel assemblies 175 to the desired height above the ground, whereupon the cylinder 60 is locked in its actuated position by the locking head 91.

Although the tires of the tire and wheel assemblies 175 have not been shown as deflated, it will be apparent that the construction of the lifting beam 16 and the manner in which the adapter cup 55 may be disposed very close to the ground to facilitate the positioning of the outer extremity of the outboard end of the beam 16 between the wheel assemblies and below the jacking point of the landing gear. Further, as described above, the path of travel of the adapter cup 55 as it is elevated can be made to coincide with the normal path of upward movement of the jacking point as the landing gear beam 177 is pivoted about its pivotal axis. As discussed above, this path of travel taken by the adapter cup 55 can be varied to suit different sizes of landing gear units by simply changing the pivot links 52 and pivotally connecting them to the carriage frame at the appropriate locations.

After the above jacking operation, or during it, the crane mechanism 21 may be mounted in one of the sockets 162 at one side of the lifting beam. When the lifting operation has been accomplished the cantilever arm 120 may be swung over the tire and wheel assembly 175 that is to be removed. The strap 133 of the crane can be then roughly adjusted to be placed around the tire and the strap tightened so that the tire is supported vertically by the strap and laterally by the metal strips 161. With the wheel assembly thus held by the crane it may be demounted from the landing gear. The arm 120 can then be swung away from the landing gear and the crane lowered by turning the crank 114 to rest the tire and wheel assembly on the ground or on a truck or the like. The crane 21 may also be conveniently used to manipulate a new tire and wheel assembly into position to be mounted on the landing gear. It may also be used to carry the tire and wheel assembly about with the jack carriage serving as a truck. When lowering of the jack is desired, the locking shaft 90 of the piston-cylinder mechanism 18 can be released and the release valve 94 opened to permit extension of the piston-cylinder mechanism and reverse movement of the beam 16. This is facilitated by the springs 19 after the load on the jack is relieved.

From the foregoing, it will be appreciated that the invention provides all of its many advantages in use in a novel and effective manner. Many modifications and variations of the preferred construction of the invention shown and described herein will be apparent to those skilled in the art in view of this disclosure. Therefore, it is to be understood that, within the scope of the appended claims, the invention may be practiced otherwise than as specifically shown and described.

What is claimed is:

1. A jack comprising a supporting base, a lifting beam having an outboard load-lifting end adjacent one end of said base and an opposite inboard end, mounting means providing a fulcrum supporting said lifting beam on said base in an elevated position for pivotal movement to raise and lower said outboard end of the beam from a level below said fulcrum to a level above said fulcrum while permitting translational movement of the beam longitudinally of said base, separate control means connected to and acting between said base and said inboard end of said beam for effecting controlled movement of said beam longitudinally of said base while the beam pivots on said fulcrum so as to constrain the movement of said outboard load-lifting end of the beam to a predetermined, fixed path that may differ from a straight line only by being a curve that is convex toward said fulcrum, and separate force-applying means acting between said lifting beam and said base for pivoting said beam on said fulcrum.

2. The jack as claimed in claim 1 wherein said control means comprises a link pivotally connected to and between said beam and said base.

3. The jack as claimed in claim 1 wherein said control means comprises a cam and cooperating follower, one being mounted on said beam and the other being mounted on said base.

4. The jack as claimed in claim 1 wherein said fulcrum means comprises a supporting link pivotally connected at its upper end to said base and at its lower end to said lifting beam intermediate its ends for permitting swinging movement of the lifting beam on the link relative to the base.

5. The jack as claimed in claim 1 wherein said fulcrum means comprises a roller and a cooperating longitudinal rolling surface, one being mounted on said beam and the other being mounted on said base.

6. The jack as claimed in claim 1 wherein said force applying means includes an hydraulic piston cylinder mechanism pivotally connected to and between the inboard end of said lifting beam and said base for pivoting said beam on said base.

7. A jack comprising a supporting base, a lifting beam mounted on said base for pivotal movement to raise and lower a load applied to a load-lifting end thereof, fulcrum means supporting the lifting beam on the base for movement longitudinally of the base while rocking on said fulcrum means, control means acting between said base and said beam for causing predetermined movement of the beam longitudinally of the base as the beam rocks on its fulcrum, force-applying means connected to and acting between said beam and said base for rocking the beam on its fulcrum, and crane means for acting in conjunction with said lifting beam to support a tire and wheel assembly elevated by the lifting beam, said crane means including a post mounted on said base, an arm extending generally horizontally from said post and swingable about the post, sling means carried by said arm from a point above said load-lifting end of said beam, and means for adjustably raising and lowering said sling, said sling being mounted on said arm for movement therealong to align the sling for attachment to said tire and wheel assembly.

8. A portable lift comprising a wheel supported carriage having a front end and a rear end, a lifting beam having a load-lifting end adjacent said rear end of said carriage, mounting means providing a fulcrum supporting said lifting beam on said carriage in an elevated position for longitudinal translational movement and for rocking movement to raise and lower said load-lifting end of the beam from a level below said fulcrum to a level above said fulcrum through a predetermined path of travel, separate actuating means acting between said carriage and said beam for raising and lowering its load-lifting end, and separate control means connected to and acting between said beam and said carriage for effecting a controlled longitudinal movement of the beam relative to the carriage as the beam rocks on its fulcrum so as to constrain the movement of said load-lifting end of the beam to a predetermined, fixed path that may differ from a straight line only by being a curve that is convex toward said fulcrum.

9. A portable lift comprising a vertically shiftable, wheel-supported carriage, including a substantially horizontal, ground engageable, supporting foot extending from one end thereof, said foot being engageable with the ground when said carriage is shifted vertically downwardly; a lifting beam having a load-lifting end adjacent said one end of said carriage, fulcrum means mounting said lifting beam on said carriage in an elevated position for longitudinal translational movement and for rocking movement to raise and lower said load-lifting end of the beam from a level below said fulcrum to a level above said fulcrum, a separate control link pivotally connected to and between said lifting beam and said carriage for imparting to said beam as it rocks a predetermined longitudinal movement sufficient to constrain the load-lifting end of the beam to reciprocation along a path that may differ from a straight line only by being a curve that is convex toward said fulcrum; and separate actuating means acting between said lifting beam and said carriage for raising and lowering said load-lifting end of said lifting beam.

10. A portable lift comprising a vertically shiftable, wheel-supported carriage, including a substantially horizontal, ground-engageable, supporting foot extending from one end thereof, said foot being engageable with the ground when said carriage is shifted downwardly; a lifting beam having a load-lifting end adjacent said one end of said carriage, mounting means providing a fulcrum supporting said lifting beam on said carriage in an elevated position for pivotal movement to raise and lower said load-lifting end of the beam from a level below said fulcrum to a level above said fulcrum and for simultaneous translational movement of the beam longitudinally of said carriage, separate control means connected to and acting between said base and said lifting beam for causing predetermined translational movement of said beam as said load-lifting end of the beam is raised and lowered so as to constrain the movement of said load-lifting end of the beam to a predetermined, fixed path that may differ from a straight line only by being a curve that is convex toward said fulcrum; and separate actuating means for raising and lowering said load-lifting end of said beam, said actuating means including a cooperating, hydraulic piston and cylinder, one being pivotally connected to said lifting beam and the other being pivotally connected to said carriage.

11. A portable lift comprising an elongated, vertically shiftable, wheel-supported carriage having a front end and a rear end and including a substantially horizontal, ground-engageable, supporting foot extending rearwardly therefrom, said foot being engageable with the ground when said carriage is shifted vertically downwardly; a lifting beam having a load-lifting outboard end extending rearwardly to adjacent said rear end of said carriage and having an oppositely extending inboard end portion; means connecting said lifting beam to said carriage for longitudinal translational movement and for oscillatory movement wherein said load-lifting outboard end of the beam moves through a predetermined path of travel; said connecting means including a supporting link pivotally suspended from said carriage and pivotally connected to said lifting beam intermediate its ends for permitting swinging movement thereof relative to the carriage as the beam rocks, and a separate control link having one end pivotally connected to said carriage and its other end pivotally connected to said inboard end portion of said lifting beam; and actuating means for rocking said lifting beam, said actuating means including spring means acting between said carriage and said lifting beam to urge said outboard end of the beam downwardly, a hydraulic cylinder pivotally engaging said inboard end portion of said lifting beam for oscillatory movement relative thereto, and a cooperating piston having a piston rod extending from said cylinder, said piston rod being pivotally connected to said carriage for permitting pivotal movement of said cylinder and piston relative to the carriage as the beam is rocked, and means for admitting liquid to said cylinder to raise said outboard end portion of said lifting beam against the action of said spring means.

12. A portable lift as claimed in claim 11, including a crane mechanism for acting in conjunction with said lifting beam to support a tire and wheel assembly elevated by the lifting beam, comprising a post mounted on said carriage, an arm for defining a trackway extending generally horizontally from said post, said arm being at least coextensive rearwardly with said load-lifting outboard end of said lifting beam, a hook slidable along said trackway, a tire sling suspended from said hook for supporting said elevated tire and wheel assembly, and means for adjustably raising and lowering said sling to align it vertically with said elevated tire and wheel assembly.

13. A portable lift according to claim 12 wherein said tire sling is movably suspended from said hook for rotation substantially about the axis of a tire and wheel assembly supported by the sling.

14. A combination jack and crane for use in removing and replacing vehicle tire and wheel assemblies, comprising a base adapted to engage and rest upon the ground adjacent a jacking point on the vehicle, a powered lifting mechanism mounted on said base and projecting rearwardly to a lifting seat thereon for engaging said jacking point, said base including rearwardly extending, ground-engaging members extending rearwardly beyond said lifting seat and spaced laterally to straddle the lifting seat and a tire and wheel assembly of the vehicle, and a crane mechanism mounted on said base, said crane mechanism including a post extending generally vertically from the base, a transversely extending arm mounted on said post for horizontal swinging movement about the post to pass over the space between said ground-engaging members, said arm extending at least to a point vertically over said lifting seat, sling means carried by said arm for embracing and suspending said tire and wheel assembly of the vehicle, means for adjustably moving said sling along said arm to align the sling horizontally with a part of a load to be lifted and removed by the sling, and means operative to adjustably rise and lower said sling according to the elevation of said tire and wheel assembly when elevated by action of the lifting mechanism against said jacking point.

15. A combination jack and crane according to claim 14 including means suspending the sling for rotation substantially about the axis of a tire and wheel assembly embraced by the sling.

16. A combination jack and crane for use in removing and replacing vehicle tire and wheel assemblies, comprising a base adapted to engage and rest upon the ground adjacent a jacking point on the vehicle, a powered lifting mechanism mounted on said base and projecting rearwardly to a lifting seat thereon for engaging said jacking point, said base including ground-engaging members extending rearwardly beyond said lifting seat and spaced laterally to straddle the lifting seat and a tire and wheel assembly of the vehicle with the jacking point thereof also straddled by said members, and a crane mechanism mounted on a laterally extending portion of said base, said crane mechanism including a post extending generally vertically from the base, an arm mounted on said post and extending generally horizontally therefrom for horizontal swinging movement about the post to pass over the space between said ground-engaging members, said arm extending at least to a point vertically over said lifting seat, sling means mounted on said arm for adjusting movement therealong for embracing and suspending said tire and wheel assembly of the vehicle, and means operative to adjustably raise and lower the sling according to the elevation of said tire and wheel assembly when elevated by action of the lifting mechanism against said jacking point.

17. A combination jack and crane for use in removing and replacing vehicle tire and wheel assemblies, comprising a base adapted to engage and rest upon the ground adjacent a jacking point on the vehicle, a powered lifting mechanism mounted on said base and projecting rearwardly to a lifting seat thereon for engaging said jacking point, said base including ground-engaging members extending rearwardly beoynd said lifting seat and spaced laterally to straddle the lifting seat and a tire and wheel assembly of the vehicle with the jacking point thereof also straddled by said members, and a crane mechanism mounted on a laterally extending portion of said base, said crane mechanism including an extensible post extending generally vertically from the base, an arm mounted on said post and extending generally horizontally therefrom for horizontal swinging movement about the post to pass over the space between said ground-engaging members, said arm extending at least to a point vertically over said lifting seat, sling means mounted on said arm for embracing and suspending said tire and wheel assembly of the vehicle, said sling means being mounted on said arm for horizontal travel to align it horizontally with said wheel and tire assembly, and means operative to raise and lower said arm to adjust the sling vertically according to the elevation of said tire and wheel assembly when elevated by action of the lifting mechanism against said jacking point.

18. A combination jack and crane for use in removing and replacing vehicle tire and wheel assemblies, comprising a base adapted to engage and rest upon the ground adjacent a jacking point on the vehicle, a powered lifting mechanism mounted on said base and projecting rearwardly to a lifting seat thereon for engaging said jacking point, said base including ground-engaging members extending rearwardly beyond said lifting seat and spaced laterally to straddle the lifting seat and a tire and wheel assembly of the vehicle supported thereby, and a crane mechanism adapted to be mounted on said base, said crane mechanism including a post extending generally vertically from the base, a horizontally extending arm mounted on said post for vertical movement and for horizontal swinging movement about the post, sling means carried by said arm for embracing and suspending said tire and wheel assembly of the vehicle, said sling means being mounted on said arm for horizontal travel to align it horizontally with said wheel and tire assembly, and means operative to raise and lower said sling to adjust the sling vertically according to the elevation of said tire and wheel assembly when elevated by action of the lifting mechanism against said jacking point, and means on opposite sides of said base for interchangeably receiving and supporting the post of said crane for operation from either side of said lifting mechanism.

19. A portable lift comprising an elongated base having a front end and a rear end, a lifting beam having a load-lifting outboard end extending rearwardly to adjacent said rear end of said carriage and having an oppositely extending inboard end portion, means connecting said lifting beam to said carriage for longitudinal translational movement and for rotational movement about a fulcrum between the outboard end and the inboard end portion of the beam to raise and lower said outboard end through a predetermined path of travel while lowering and raising said inboard end portion, and actuating means for rocking said lifting beam about said fulcrum, said actuating means including spring means acting between said carriage and said lifting beam to urge said outboard end of the beam downwardly, and a hydraulic cylinder and piston pivotally engaging said inboard end portion of said lifting beam and said carriage for permitting pivotal movement of said cylinder and piston relative to the carriage and the beam as the beam is rocked, and means for admitting liquid to said cylinder to raise said outboard end of said lifting beam against the action of said spring means.

20. A portable lift comprising an elongated base having a front end and a rear end, a lifting beam having a load-lifting outboard end extending rearwardly to adjacent said rear end of said carriage and having an oppositely extending inboard end portion, means connecting said lifting beam to said carriage for longitudinal translational movement and for rotational movement about a fulcrum to raise and lower said outboard end through a predetermined path of travel while lowering and raising said inboard end portion, said connecting means including a supporting link pivotally connected to the carriage and to said lifting beam between the outboard end and the inboard end portion of the beam defining said fulcrum, said link permitting swinging movement of the fulcrum relative to the carriage as the beam rocks on the fulcrum, and a control link having one end pivotally connected to a fixed point on said carriage and having its other end pivotally connected to said inboard end portion of said lifting beam; and force-applying means acting between said lifting beam and said carriage for applying a downward force on the inboard end of said beam for pivoting it on said supporting link to raise a load on the outboard end of the beam.

21. A portable lift comprising an elongated carriage having a front end and a rear end, a lifting beam having a load-lifting outboard end extending rearwardly to adjacent said rear end of said carriage and having an oppositely extending inboard end portion, means connecting said lifting beam to said carriage including a mounting link pivotally suspended from said carriage adjacent its upper end and providing a fulcrum adjacent its lower end supporting said lifting beam on said carriage between the outboard end and the inboard end portion of the beam for longitudinal translational movement and for rotational movement to raise and lower said outboard end through a predetermined path of travel while lowering and raising said inboard end portion, and a control link having one end pivotally connected to said carriage and having its other end pivotally connected to said inboard end portion of said lifting beam for effecting a controlled longitudinal movement of the beam relative to the carriage; and actuating means for rocking said lifting beam, said actuating means including spring means acting between said carriage and said lifting beam to urge said outboard end of the beam downwardly, and a hydraulic cylinder and piston pivotally engaging said inboard end portion of said lifting beam and said carriage for permitting pivotal movement of said cylinder and piston relative to the carriage and the beam as the beam is rocked, and means for admitting liquid to said cylinder to raise said outboard end of said lifting beam against the action of said spring means.

22. A portable lift comprising an elongated carriage having a front end and a rear end, a lifting beam having a load-lifting outboard end extending rearwardly to adjacent said rear end of said carriage and having an oppositely extending inboard end portion, means connecting said lifting beam to said carriage for longitudinal translational movement and for rotational movement about a fulcrum to raise and lower said outboard end through a predetermined path of travel while lowering and raising said inboard end portion, said connecting means including a supporting link pivotally connected to said carriage and to said lifting beam between the outboard end and the inboard end portion of the beam for defining said fulcrum, said link permitting swinging movement of the fulcrum relative to the carriage as the beam rocks on the fulcrum, and a control means for effecting a controlled longitudinal movement of the beam relative to the carriage as the beam pivots on the supporting link; and actuating means for rocking said lifting beam, said actuating means including spring means acting between said carriage and said lifting beam to urge said outboard end of the beam downwardly, and a hydraulic cylinder and piston pivotally engaging said inboard end portion of said lifting beam and said carriage for permitting pivotal movement of said cylinder and piston relative to the carriage and the beam as the beam is rocked, and means for admitting liquid to said cylinder to raise said outboard end of said lifting beam against the action of said spring means.

23. A jack comprising a supporting base, a lifting beam mounted on said base for pivotal movement to raise and lower a load applied to a load-lifting end thereof, fulcrum means supporting the lifting beam on the base for movement longitudinally of the base while rocking on said fulcrum means, force-applying means connected to and acting between said beam and said base for rocking the beam on its fulcrum, and crane means for acting in conjunction with said lifting beam to support a tire and wheel assembly elevated by the lifting beam, said crane means including a post mounted on said base, an arm extending generally horizontally from said post and swingable about the post, sling means carried by said arm from a point above said load-lifting end of said beam, and means for adjustably raising and lowering said sling, said sling being mounted on said arm for movement therealong to align the sling for attachment to said tire and wheel assembly.

References Cited in the file of this patent

UNITED STATES PATENTS

| | | |
|---|---|---|
| 2,031,700 | Fiedler | Feb. 25, 1936 |
| 2,099,903 | Nilson | Nov. 23, 1937 |
| 2,476,380 | Manke | July 19, 1949 |
| 2,766,007 | Krilanovich | Oct. 9, 1956 |
| 2,785,807 | Prowinsky | Mar. 19, 1957 |
| 2,822,931 | Sparrow | Feb. 11, 1958 |
| 2,980,271 | Ulinski | Apr. 18, 1961 |
| 3,024,925 | Werner et al. | Mar. 13, 1962 |
| 3,086,751 | Poznik | Apr. 23, 1963 |

FOREIGN PATENTS

| | | |
|---|---|---|
| 528,305 | Belgium | May 15, 1954 |